United States Patent [19]
Baruch

[11] Patent Number: 5,157,922
[45] Date of Patent: Oct. 27, 1992

[54] DEVICE FOR GENERATING UTILIZABLE ENERGY FROM POTENTIAL ENERGY

[76] Inventor: Rosenberg Baruch, 4 Hadekalim St., Ramat-Hadar, 45220 Hod-Hasharon, Israel

[21] Appl. No.: 690,934

[22] PCT Filed: Jan. 11, 1990

[86] PCT No.: PCT/DE90/00011
§ 371 Date: Jul. 10, 1991
§ 102(e) Date: Jul. 10, 1991

[87] PCT Pub. No.: WO90/08259
PCT Pub. Date: Jul. 26, 1990

[30] Foreign Application Priority Data

Jan. 11, 1989 [DE] Fed. Rep. of Germany ....... 3900636
Dec. 15, 1989 [DE] Fed. Rep. of Germany ....... 3941530

[51] Int. Cl.[5] .............................................. F03G 7/08
[52] U.S. Cl. ........................................ 60/325; 60/668; 417/229
[58] Field of Search ................... 417/229; 60/668, 325

[56] References Cited

U.S. PATENT DOCUMENTS

| 4,212,598 | 7/1980 | Roche et al. | 417/229 |
| 4,339,920 | 7/1982 | Le Van | 417/229 |
| 4,739,179 | 4/1988 | Stites | 290/1 R |

FOREIGN PATENT DOCUMENTS 2941079  4/1981  Fed. Rep. of Germany.
3542031  7/1986  Fed. Rep. of Germany.

Primary Examiner—Allen M. Ostrager
Attorney, Agent, or Firm—Beveridge, DeGrandi & Weilacher

[57] ABSTRACT

The invention is a device for generating utilizable energy from potential energy of slowly driving motor vehicles such as street traffic. The device comprises at least one rigid pivoted plate supported on a bearing block. The plate can be lowered by the force of gravity of a motor vehicle such that air is urged out of flexible containers and directed into a pressure equalizing reservoir connected to a turbine or a hydraulic motor. Storage containers for water are supported on both sides of the bearing block on the pivoted plate. The filling of the storage containers is controlled in a manner such that the storage container is exactly filled at the right moment so that it assists in lowering the plate caused by the motor vehicle.

13 Claims, 4 Drawing Sheets

DEVICE FOR GENERATING UTILIZABLE ENERGY FROM POTENTIAL ENERGY

FIELD OF THE INVENTION

This invention relates to a device for generating utilizable energy from potential energy of slowly driving motor vehicles such as street traffic vehicles, whereby the device comprises at least one rigid pivoted plate supported on a bearing block, the plate being lowerable by the force of gravity of a motor vehicle, whereby a flowable fluid is urged out of flexible containers and directed into a pressure equalizing reservoir being connected with a motor such as a turbine or a hydraulic motor.

BACKGROUND DISCUSSION

A device for generating utilizable energy from potential energy of motor vehicles of street traffic is already known from U.S. Pat. No. 4,339,920. According to this patent a plurality of flexible containers, which are filled with an incompressible fluid are squeezed together, and subsequently the fluid is directed, possibly after passing a flexible and hence extendable container, to a hydraulic motor for generating utilizable energy. The containers, being compressible by the gravity of a motor vehicle, are disposed in small chambers which are inserted within the traffic lane, whereby the covers for these chambers can be urged by the gravity of a motor vehicle into a position underneath the surface of the traffic lane. Thereby the tire of the motor vehicle is hit very hard like in case of driving through potholes.

Furthermore, a device for generating utilizable energy from potential energy of motor vehicles is known from German Patent No. DE-OS 35 42 031. According to this patent flexible containers are filled with water by means of pivoted rigid plates and the urged out water is fed for generating energy into a turbine.

A disadvantage of the device shown in German Patent No. DE-OS 35 42 031 is that there has to be taken special measures for driving back the urged out water into the flexible containers and thereby to move back the pivoted plates into their original position. Furthermore, the requirement of having to urge incompressible fluid out of the flexible containers has shown to be disadvantageous because, in this case, the energy cannot be accumulated without taking additional measures in the form of a fluid under pressure and hence a turbine cannot be driven in an optional moment.

SUMMARY OF THE INVENTION

It is the aim of the present invention to create a device which renders it possible to accumulate energy in the form of a fluid under pressure and furthermore to additionally utilize the force of gravity of the water flowing out of a turbine for generating energy.

According to this invention, this aim is achieved in that the fluid being urged out of the flexible containers into the pressure equalizing reservoir is air which presses water also located within the pressure equalizing reservoir through the turbine or through the hydraulic motor, respectively. Also, a storage container for water is positioned downstream from the turbine of the hydraulic motor and directing means such as an exit channel extending from the turbine for directing the water exiting the turbine into the downstream water storage container. The storage container is supported on the plate on both sides of the bearing block, whereby the storage container assists in lowering the pivoted plate and hence assists in driving out the air. Also, the filing of the storage containers is controlled in a manner such as by motor vehicle actuating signal transmitters which open and close valves. In this way, the suitable storage container is exactly filled at the right moment so that it actually assists in lowering the plate being travelled over by the motor vehicle. According to a preferred embodiment of the invention, piston pumps are provided which are connected to the pivoted plates for additionally urging out the air and are also connected to the pressure equalizing reservoir.

Advantageously, the turbine is also connected to a compressor which refills the flexible containers with fresh air when required.

According to another preferred embodiment, the signal transmitter, which is first actuated by a vehicle passing over it and is preferably disposed in the direction of motion of the vehicle and spaced from the pivoted plates in front of it.

Moreover, as another advantage, the device may comprise a main system and an additional auxiliary system disposed in the direction of motion of the vehicle in front and/or at the back of the main system. The auxiliary system is provided with flexible containers that are disposed under pivoted plates, whereby the passing of a vehicle over the pivoted plates urges water out into a storage container for water of the main system or air is urged into the pressure equalizing reservoir of the main system.

According to a further preferred embodiment the device is fixed within or on a traffic lane as a speed bump type threshold for slowing down the traffic. Another possibility is to fix the device within or on the traffic lane or within or on the sidewalk in front of a traffic light.

The pivoted plates can be connected to one another by means of a hinge so as to form pivoted plate units. Thus, in a preferred embodiment of the invention the pivoted plate unit consists of three subsequently linked plates, the middle plate of which is pivoted around an axis being horizontal and transverse with respect to the traffic lane, and the flexible containers are located under the pivoted plate unit.

Two of these pivoted plate units may be disposed with respect to one another in a manner such that their middle plates are pivoted between their end plates about one and the same axis (e.g., an axis which is horizontal and transverse with respect to the traffic lane) and the middle plates are always disposed with respect to one another in a crossed configuration, whereby the flexible containers are disposed between the two pivoted plate units.

According to another preferred embodiment of the invention the device comprises four pivoted plate units. Each pivoted plate unit being comprised of two plates which are linked together such that two of said pivoted plate units of a first type are disposed with respect to one another in a manner whereby one of the plates of each unit is pivoted around a common axis that is horizontal and transverse with respect to the traffic lane. The two pivoted plate units are disposed with respect to one another in a crossed configuration. In addition, one plate of each of the two pivoted plate units of a second type is also pivoted around an axis being horizontal and transverse with respect to the traffic lane. The two pivoted plates of the second type of pivoted plate units support one plate of the two pivoted plate units of the first type, respectively, in a manner in which they lift these plates when the motor vehicle reaches a certain position. In this embodiment, flexible containers are disposed between the pivoted plate units of the first type and under the pivoted plate units of the second type.

Preferably, on both sides of the bearing block, storage containers for water are supported steplike on different levels with respect to each other, whereby the difference in level allows for water in one storage container to flow from that storage container into another.

In another preferred embodiment of the invention the storage containers for water are supported, on both sides of the bearing block, in a steplike fashion so as to be at different levels with respect to each other, whereby the difference of level allows for water to be directed several times form one storage container to another across the bearing or supporting block. During which time, the pivoted plates remain in rocking motion with the passing of a vehicle through valve controlled changes in the distribution of the water-weight.

Advantageously, the water is directed to a large stationary storage container for water prior to being directed into the other storage containers for water.

In addition to the storage containers, piston pumps can be connected to the pivoted plates such that energy is also generated by the movement of the plates back to their original position. The piston pumps may also urge air into the pressure equalizing reservoir by dislocating the plates because of the force of gravity of the motor vehicles as well as by the flexible containers being disposed underneath the pivoted plates.

Moreover, the storage containers for water can be made of two parts, that means of a rigid container and of a flexible container, whereby the rigid part urges water out from the flexible part and this water is directed to a turbine.

To make the rotation of the turbine smoother, it is provided with a flywheel. A flywheel is particularly advantageous because the supplying of energy to the turbine in the form of flowing fluid takes place discontinuously.

BRIEF DESCRIPTION OF THE DRAWINGS

The present invention will be more fully understood from the detailed description given herein below and the accompanying drawings which are given by way of illustration only, and thus are not limitative of the present invention and wherein:

As shown in FIG. 1, a motor vehicle moves from the right to the left towards the pivoted plate unit 5 consisting of pivoted plates 2, 3 and 4.

DETAILED DESCRIPTION OF THE PREFERRED EMBODIMENTS

Figure 1:
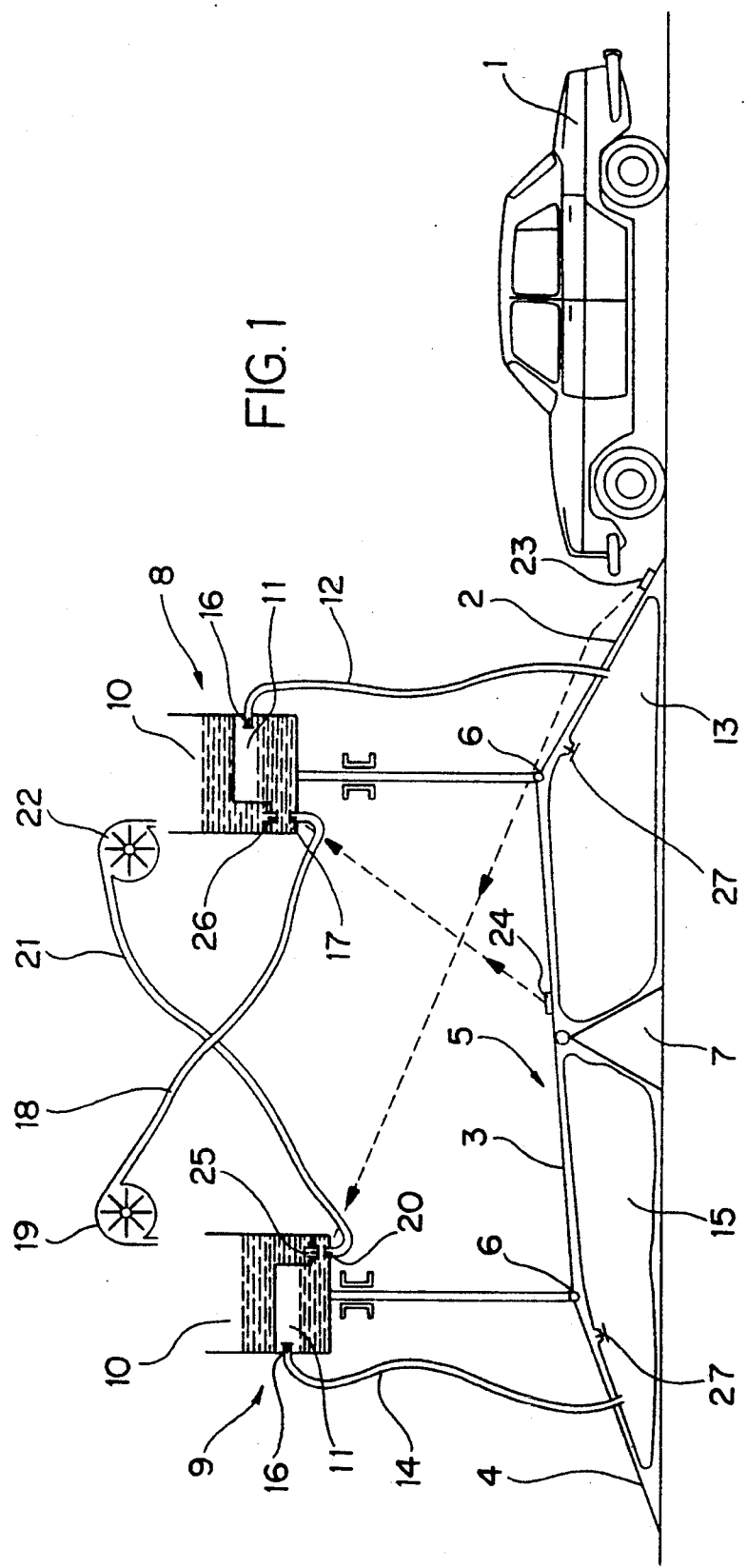
FIG. 1 a side view of a first embodiment of the invention.

As shown in FIG. 1, middle plate 3 is preferably pivoted on bearing block 7 near it's middle portion and about an axis which is horizontal and transverse with respect to the traffic lane.

Near or directly at the hinges 6 are fixed a first storage container 8 and a second storage container 9 for water and compressed air. Both storage containers comprise two parts, i.e., an upper container 10 that is open to atmosphere and a closed pressure equalizing reservoir 11, partly filled with water, partly filled with compressed air.

A first hose 12 extends out of the part filled with air of the pressure equalizing reservoir 11 of the first storage container 8 and is directed to a first flexible container 13 disposed underneath the pivoted plates 2 and 3.

Analogically, a second hose 14 is directed from the part filled with air of the pressure equalizing reservoir of the second storage container 9 towards a second flexible container 15 disposed underneath the pivoted plates 3 and 4.

Both hoses open into the flexible containers, respectively, and are provided with a nonreturn valve 16 towards the corresponding pressure equalizing reservoir 11. Hose 18 extends into the body of water in the closed pressure equalizing reservoir 11 which is provided with a nonreturn valve 17 at the side of the container. Hose 18 has an opposite end which leads to a first turbine 19. Analogically, another hose 21 extends from the second storage container 9 and is provided with a nonreturn valve 20 at the side of the storage container. The other end of hose 21 leads to a second turbine 22.

The nonreturn valve 20 of the second storage container 9 can be opened by signal transmitter 23, while nonreturn valve 17 of the first storage container 8 can be opened by a signal of signal transmitter 24. When the approaching vehicle touches signal transmitter 23, nonreturn valve 20 is opened and water is urged by means of compressed air within pressure equalizing reservoir 11 through the turbine 22. From the outlet of turbine 22 water flows towards part 10 of the first storage container 8 being open to atmosphere. At the same moment vehicle 1 drives on pivoted plate 2, whereby the plate 3 is linked to it and pivoted on bearing block 7 and turns around an axis being horizontal and transverse with respect to the traffic lane. As a result of this turning movement the flexible container (or containers) 13, which is filled with air and disposed under plates 2 and 3, is squeezed together urging out compressed air through the first hose 12 into the pressure equalizing reservoir of the first storage container 8. Thereby nonreturn valve 16 opens by itself.

Because in the meantime a sufficient amount of water has passed turbine 22 into the first storage container 8, the force of gravity of the first storage container 8 which is supported near hinge 6 connecting plate 2 and plate 3 assist in squeezing together the first flexible container 13, whereby it assists in drawing up a storage of compressed air within pressure equalizing reservoir 11 of storage container 8. When the vehicle reaches bearing block 7 being disposed near the second signal transmitter 24, nonreturn valve 17 of the first storage container 8 is opened and water is urged by the compressed air drawn up before within pressure equalizing reservoir 11 of the first storage container 8 through hose 18 into turbine 19, the outlet of which terminates in part 10 of the second storage container 9 open to atmosphere, wherein by the force of gravity of the container 9 assist in forcing plate 3 to turn in the other direction. The storage of compressed air within the second storage container 9, which had been used up before, is built up again after nonreturn valve 25 had previously been opened under the pressure of the water within part 10 of the second storage container 9 after the pressure equalizing reservoir 11 had been refilled with water. By means of the pressure being built up again within pressure equalizing reservoir 11, the nonreturn valve 25 is closed again.

When the vehicle leaves plate 4 and hence the whole device, the storage of compressed air within the pressure equalizing reservoir 11 of the first storage container 8 is used up again and no water is left within the pressure equalizing reservoir. The causes nonreturn valve 26 of the first storage container 8 to open under the pressure of the water within part 10 of the storage container being open to atmosphere and to discharge into the pressure equalizing reservoir so as to fill it with water again. That means that the final state, i.e. the state after the vehicle has left the device, is the same as the original state, i.e. the state before the vehicle was driven onto the device.

The plate 3 returns thereby itself into a certain predetermined position. Thereby the nonreturn valves 27 of the flexible containers 13 or 15, respectively, open and render possible that fresh air can pass into the containers.

That means that in the original and the final state the part 10 of the first storage container 8 being open to atmosphere is empty, the pressure equalizing reservoir 11 is partly filled with water and the pressure within the pressure equalizing reservoir is the same as the atmospheric pressure, while the part 10 of the second storage container 9 being open to atmosphere is filled with water as well as the pressure equalizing reservoir 11 is partly filled with water and partly filled with compressed air.

Hence, if a following vehicle drives onto the device, the whole procedure can take place again, whereby the turbines 19 and 22 are both driven for a short period of time and may for instance generate electrical power by means of a dynamo being coupled with the turbines.

Because of supplying of energy by the vehicles takes place discontinuously, i.e. temporarily not constant, it is convenient to provide the turbines 19, 22 with a flywheel which has the function to store kinetic energy for bridging over the period of time when no vehicle drives onto the device.

Figure 2:
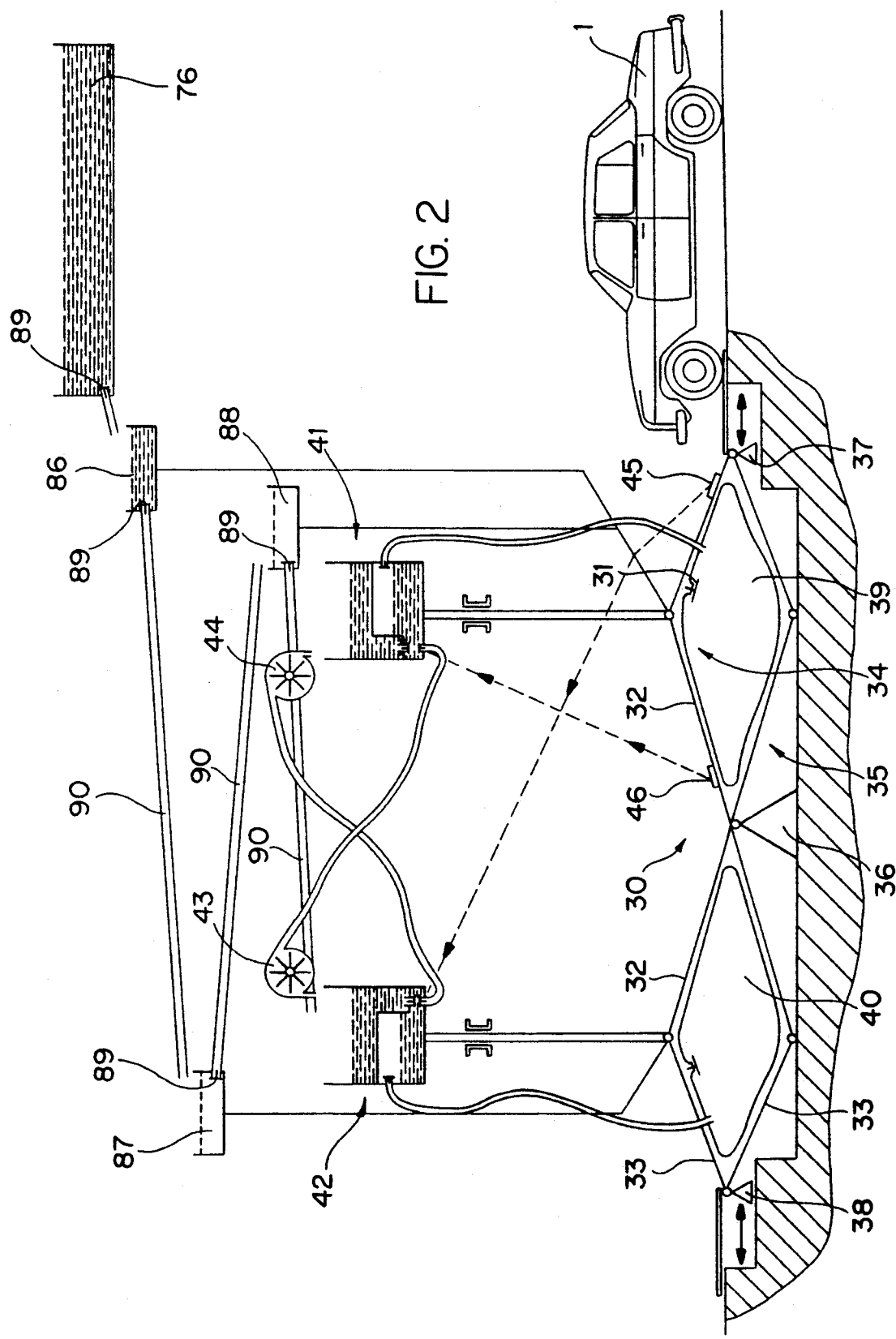
FIG. 2 a side view of a second embodiment of the invention.

FIG. 2 shows another embodiment of the invention. One of the differences referring to the first embodiment as shown in FIG. 1 is a different construction of the entire pivoted plate unit. This embodiment comprises two pivoted plate units 34 and 35, which are both built of three plates 31, 32, 33, respectively, being linked together. Both middle plates 32 of the pivoted plate units 34 and 35, respectively, are pivoted on bearing block 36 near their middle zone, while both outer plates 31 and 33 of the pivoted plate units 34 and 35, respectively, are pivoted on displaceable bearing blocks 37 and 38, respectively, which bearing blocks are spaced in the direction of travel.

A first and a second flexible container 39 and 40, respectively, being filled with air are disposed between the pivoted plate units 34 and 35

Analogical to the embodiment shown in FIG. 1, this second embodiment comprises a first and a second storage container 41 and 42 as well as a first and a second turbine 43 and 44 and a first and a second signal transmitter 45 and 46, which control the flow through the turbines 43 and 44 in a manner such that the force of gravity of the water flowing out of the turbines into the storage containers 41 and 42 assists in squeezing the flexible containers 39 and 40 together.

Beside the storage containers 41 and 42 comprising the pressure equalizing reservoirs 11, further storage containers 86, 87, 88 for water are supported near the hinge connecting plates 31 and 32. The storage containers for water 86, 87, 88 are supported steplike on different levels with respect to each other. The storage container 86 on the highest level is fed with water by a large stationary storage container 76. This water may be gathered from rain water or may be pumped into the container 76 by the power generated by the vehicles 1.

Because of the difference of level the water starting from the container 86 on the highest level can be directed several times by means of ducts 90 from one storage container for water across the bearing block 36 into another 87 or 88 on a lower level, whereby the pivoted plates 32 remain in rocking motion without passing of a vehicle 1 by means of changing the distribution of the water-weight controlled by valves 89. Controlling the rocking movement is realized by opening and closing the valve 89.

Finally, the water is directed from the lowest storage container 88 into the storage container 42 comprising the pressure equalizing reservoir 11. A further displacement of the water between the containers 41 and 42 is realized in the way described above by means of compressed air which is generated by the flexible containers 39 and 40 and fed into the pressure equalizing reservoirs 11. It may also be possible to fix more storage containers 86, 87, 88 for water without pressure equalizing reservoirs or storage containers 41, 42 with pressure equalizing reservoir 11 at one and the same place on plate 32.

Figure 3:
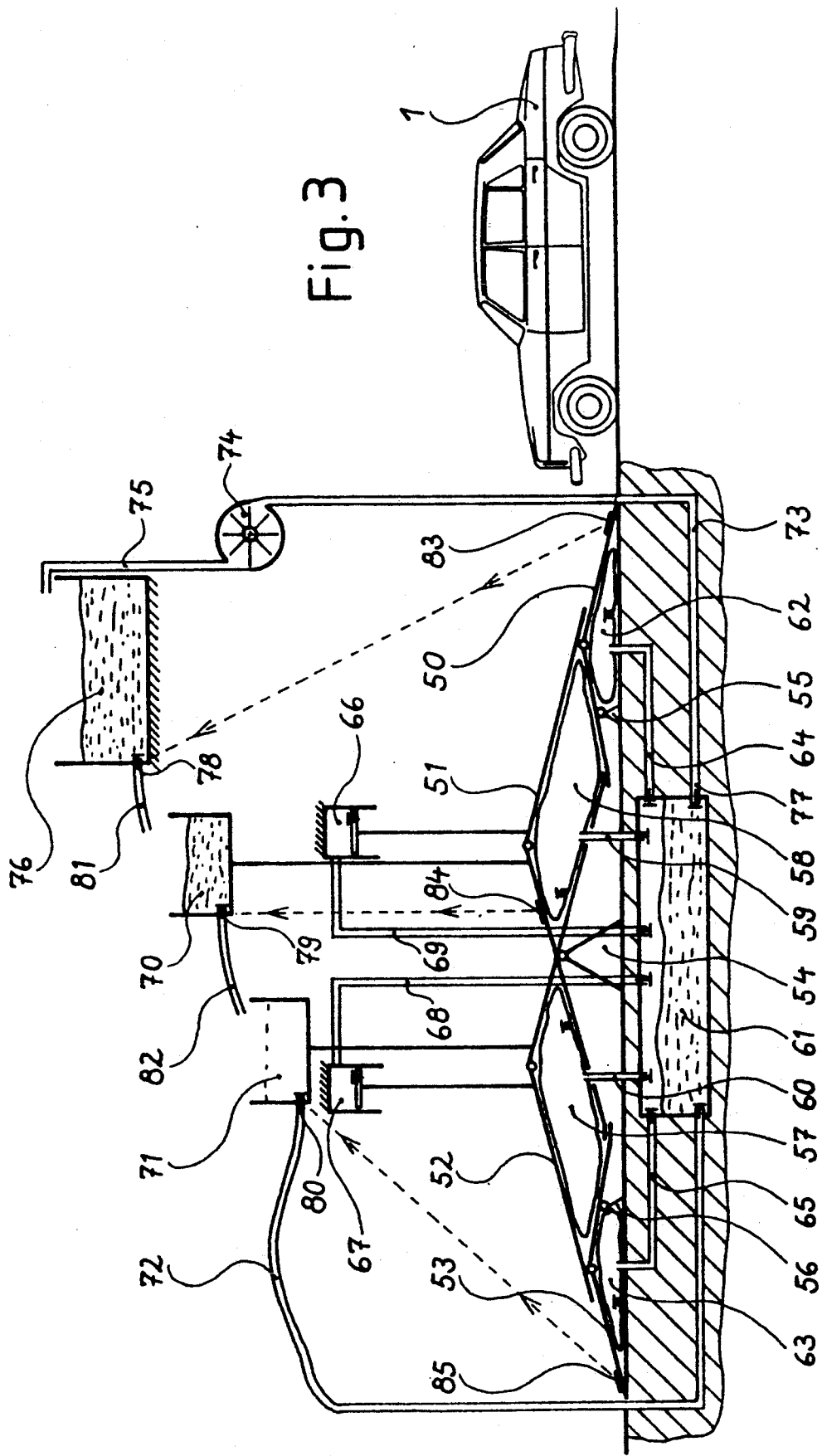
FIG. 3 a side view of a third embodiment of the invention.

According to a third embodiment of the invention as shown in FIG. 3 the entire pivoted plate unit comprises four pivoted plate units 50-53 being all built of two plate units linked together, one plate of a first type 51 and 52 is pivoted on a common bearing block 54. The free ends of this two pivoted plates are pivoted on a common bearing block 55 or 56, respectively, and support one plate of both pivoted plate units of a second type 50 and 53, respectively.

Between the pivoted plate units 50, 51 and 52 and between the units 51, 52 and 53 air filled flexible containers 57 and 58 are provided, respectively. Flexible containers 57 and 58 also open towards duct 59 and 60, respectively. The opposite ends of ducts 59 and 60 are provided with a nonreturn valve and open into a pressure equalizing reservoir 61. Flexible containers 62 and 63 are positioned under the second type of pivoted plate units 50, 53. Flexible containers 62 and 63 are in fluid communication with ducts 64 and 65, respectively. The opposite ends of ducts 64 and 65 terminate in pressure equalizing reservoir 61, and this end of the ducts is provided with a nonreturn valve as well.

Near the hinges of the first type of pivoted plate units 51, 52, piston pumps 66 and 67 are connected to the plates. The pumps are connected by means of ducts 68 and 69 with the pressure equalizing reservoir 61. The ducts are also provided with a nonreturn valve at their end terminating within the pressure equalizing reservoir.

Moreover, the storage containers 70 and 71 for water are supported on the plate units 51 and 52 near the hinges of the plate units, respectively. The last storage container 71 in driving direction is connected to the pressure equalizing reservoir 61 by means of a flexible hose 72. Hose 72 (unlike the aforementioned ducts 59,60; 64,65; 68,69, which come from the flexible containers 57, 58 or 62, 63, respectively, or from the piston pumps 66, 67) do not terminate within the space filled with air of the pressure equalizing reservoir 61, but the hose 72 terminates within the space filled with water. The end of the hose 72 at the pressure equalizing reservoir is provided with a nonreturn valve 80.

Furthermore, pressure equalizing reservoir 61 is connected via duct 73 with a turbine 74, the outlet duct 75 of which terminates into a large stationary storage container 76. The end of duct 73 which terminates within the pressure equalizing reservoir is provided with a controllable valve, i.e. with a valve 77 which can be opened or closed optionally from outside.

The stationary storage container 76 as well as the storage containers 70 and 71 which can be displaced in a vertical direction and are supported on pivoted plate units 51 and 52, respectively, are provided near its bottom, respectively, with a controllable nonreturn valve, i.e. a nonreturn valve 78, 79 or 80, respectively, which can be opened by a signal from the outside. From the valve 78 of the stationary storage container 76, a duct 81 provides directing means for directing water to storage container 70 and from valve 79 of this storage container a duct 82 is directed to storage container 71, valve 80 of which is connected to hose 72, which terminates within the pressure equalizing reservoir 61 as already mentioned above.

The valves 78, 79 and 80 are controllable by means of signal transmitters 83, 84 and 85, respectively. When a motor vehicle drives onto the first pivoted plate unit 50, valve 78 is opened by a signal of signal transmitter 83 and water flows into the storage container 70. At the same time the flexible containers 62 and 58 are squeezed together whereby air is urged into the pressure equalizing reservoir 61. Thereby the gravity force of the water flowing into the container 70 assist in urging down the plate unit 51 and thereby helping to urge compressed air out of containers 58 and 62 and into the pressure equalizing reservoir 61.

When the vehicle reaches the bearing block 5 being disposed near the signal transmitter 84, the valve 78 of the stationary storage container 76 is closed again and the valve 79 of the storage container 70 is opened again, whereafter water flows out of storage container 70 into storage container 71. Now the water flowing into storage container 71 which is supported on plate unit 52 assist in urging the plate units 52 down and thereby urging compressed air out of the flexible containers 63 and into the pressure equalizing reservoir 61.

When the vehicle reaches the signal transmitter 85, the valve 80 of the flexible containers 71 is opened and the water can flow back into the pressure equalizing reservoir 61 via hose 72.

The plate units 50-53 move back to their original position by themselves, whereby compressed air can be urged additionally into the pressure equalizing reservoir 61 by means of the piston pumps 66 and 67. Fresh air can be sucked into the flexible containers 50-53 through valves provided therein for the purpose when the plates return to their original position.

When valve 77 is opened, water is urged from the pressure equalizing reservoir 61 by the compressed air through the turbine 74 via duct 73, whereby the turbine may rotate a generator for instance. Finally, the water flows out of the outlet duct 75 of the turbine 74 into the stationary storage container 76, whereby the circulation of the water is completed.

Opening of the valve 77 and hence generating energy can take place any time, also after a plurality of vehicles has passed the device. Thereby it would be required, that the water flowing off from storage container 71 is interstored in an additional storage container, because feeding back the water into the pressure equalizing reservoir 61 should require no additional energy, this means that, in the moment the water is fed back no pressure in excess of atmospheric pressure should exist within the pressure equalizing reservoir 61.

Figure 4:
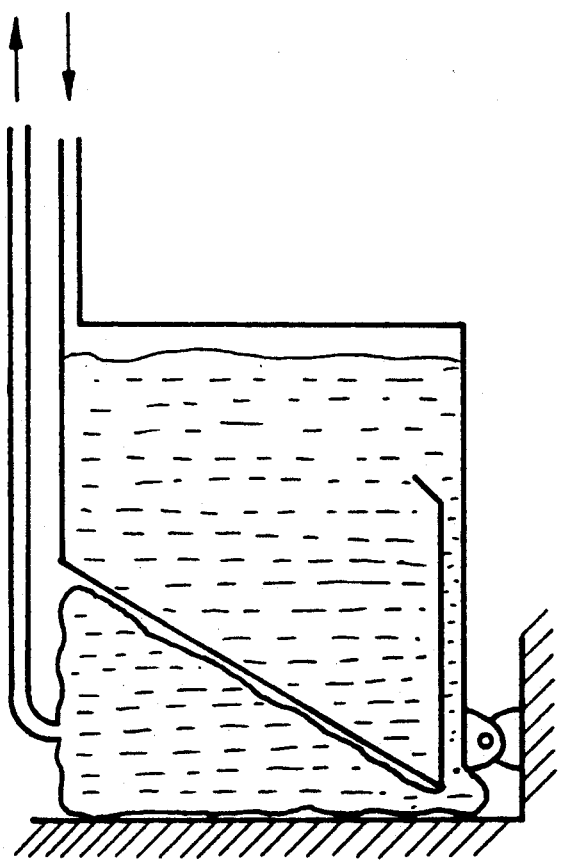
FIG. 4 a sectional side view of a storage container comprising a rigid and a flexible part.

Moreover, the storage containers 70, 71 may be designed according to FIG. 4 whereby the gravity force of the filled in water can urge water out of a flexible part of this storage container through the turbine.

What is claimed is:

1. A device for generating energy from potential energy of a moving vehicle, comprising:
    a bearing support;
    a plate assembly supported bysaid bearing support such that said plate assembly is lowered by the force of gravity of a vehicle travelling over said plate assembly;
    a first pressure equalizing reservoir adapted to retain water and air;
    a flexible container assembly containing air and in fluid communication with said rservoir,ssaid flexible container being positioned such that the lowering of said plate assembly compresses and forces air from said container and to said pressure equalizing reservoir so as to achieve a pressure increase in said reservoir;
    a first duct in fluid communication with said reservoir;
    a first valve member positioned in line with said first reservoir and said first duct;
    a first motor positioned in line with said first duct and downstream from said first reservoir;
    a first water storage container supported by said plate assembly;
    valve actuating means for opening said valve such that the increased pressure in said first reservoir is released through the forcing of water from said first reservoir, through said first duct, and past said first motor in a motor driving fashion; and
    first directing means for directing water that has exited said first reservoir into sid first water storage container, such that the water level increases at a t e when the vehicle travels over said plate assembly so as to assist the vehicle in lowering the plate assembly.

2. A device as recited in claim 1, wherein said first motor is a turbine.

3. A device as recited in claim 1, further comprising a second pressure equalizing rservoir, a second duct, as second motor, a second valve member, second directing means, and a second water storage container, and said plate assembly including a first plate section and a second plate section with the bearing support positioned between said first and second plate sections such that said plate assembly pivots about said bearing support, said flexible container assembly including a first air filled flexible container bag positioned below said first plate section and a second air filled flexible container bag positioned below said second plate section, and said second flexible container bag being in fluid communication with said first reservoir and said first flexible container bag being in fluid communication with said second reservoir, said second duct extending between said second reservoir and said second motor and said second valve being in line between said second reservoir and said second motor, said first water storage container is supported by said first plate section and said first water storage container supporting said second reservoir, said second water storage container is supported by said second plate section and said second water storage container supports said first reservoir;

said first directing means including an exit channel extending from a first motor and directing fluid into said first water storage container and said second directing means including an exit channel extending from said second motor and directing fluid into said second water storage container;

said valve actuating means including a first signal transmitter which is in communication with said first valve and a second signal transmitter which is in communication with said second valve, said first and second signal transmitters being actuated by the vehicle travelling over said plate assembly and said first signal transmitter being positioned upstream in vehicle travel direction from said second signal transmitter.

4. A device as recited in claim 3, further comprising a third water storage container which is supported by said first plate section, a fourth water storage container which is supported by said second plate section and a fifth water storage container which is supported by said first plate section, and a first fluid conduit sloping downwardly between said third and fourth water storage container, a second fluid conduit sloping downwardly between said fourth and fifth water storage container and a third fluid conduit sloping downwardly between said fifth storage container and said second water storage container, and said third fluid conduit being in fluid communication with said second motor.

5. A device as recited in claim 4, further comprising sliding bearing blocks secured to opposite ends of said plate assembly.

6. A device as recited in claim 5, further comprising sliding bearing blocks secured to opposite ends of said plate assembly.

7. A device as recited in claim 5, wherein said first directing means includes a stationary water storage container, a first fluid conduit extending from said first motor to said stationary water storage container and a second conduit extending from said stationary fluid water container to said first water storage container.

8. A device as recited in claim 7, further comprising as second valve member in line between said stationary water storage container and said second fluid conduit, and a first signal transmitter which is activated by a vehicle travelling onto the plate assembly and, when activated, opens said second valve member so as to release water from said stationary water container so as to increase the level of water in said first water storage container.

9. A device as recited in claim 8, comprising a second water storage container supported by a portion of said plate assembly in fluid communication with said first water storage container and positioned downstream in vehicle travel direction from said first water storage container and lower in level than said first water storage container, said device further including a third fluid conduit extending between said first and second water storage containers, a third valve member positioned in line in said third fluid conduit, and a second signal transmitter in communication with said third valve member and actuated by passage of the vehicle, said second signal transmitter being positioned downstream in vehicle travel direction from said first signal transmitter and said second signal transmitter including means to activate said second valve member such that water flows from said first water storage container to said second water storage container so as to assist in the lowering of the portion of the plate assembly supporting said second container at a time when said vehicle is travelling over the portion of said plate assembly.

10. A device as recited in claim 1, further comprising a piston pump which includes a piston, a piston cylinder, and a pump conduit extending downstream from said piston and into said reservoir, and said piston being linked to said plate assembly such that a rise in level in said plate assembly causes compression of said piston.

11. A device as recited in claim 1, wherein said first rservoir is positioned below said plate assembly.

12. A device as recited in claim 1, wherein said first reservoir is positioned above and supported by said plate assembly.

13. A device as recited in claim 1, wherein said plate assembly comprises three subsequently linked plates, with an intermediate plate of said three subsequently linked plates pivoting about an axis which extends horizontally with respect to an underlying traffic lane and transverse to the direction of vehicle travel, and said flexible container assembly including flexible container bags with a flexible container bag positioned on opposite sides of said bearing support and under said intermediate plate.

* * * * *